United States Patent [19]

Matschinsky et al.

[11] 3,958,462
[45] May 25, 1976

[54] RACK AND PINION STEERING MECHANISM AND THE MOUNTING THEREOF AT AN AUTOMOTIVE VEHICLE

[75] Inventors: Wolfgang Matschinsky, Munich; Hans-Jochem Hadrys, Oberschleissheim, both of Germany

[73] Assignee: Bayerische Motoren Werke Aktiengesellschaft, Germany

[22] Filed: May 5, 1975

[21] Appl. No.: 574,451

[30] Foreign Application Priority Data

May 3, 1974 Germany............................ 2421498

[52] U.S. Cl.................................. 74/498; 74/443; 280/96; 280/96.1
[51] Int. Cl.² ...................... B62D 1/20; F16H 55/14
[58] Field of Search...................... 74/498, 499, 443; 280/96, 96.1

[56] References Cited

UNITED STATES PATENTS

| | | | |
|---|---|---|---|
| 3,593,593 | 7/1971 | Bradshaw | 74/443 X |
| 3,869,139 | 3/1974 | Gage | 74/498 X |

Primary Examiner—Leonard H. Gerin
Attorney, Agent, or Firm—Craig & Antonelli

[57] ABSTRACT

A rack and pinion steering arrangement for a vehicle, preferably including a rack and pinion steering mechanism having a gearbox and a diagonally rigid holding casing encompassing the gearbox with frictional engagement by way of an elastic and intermediate layer with said holding casing being directly attachable to a fixed vehicle front-axle support. Various preferred embodiments include constructional features assuring non-rotation of the gearbox as well as a firm elastic clamping action on the gearbox by way of the intermediate layer around the periphery of the gearbox.

36 Claims, 9 Drawing Figures

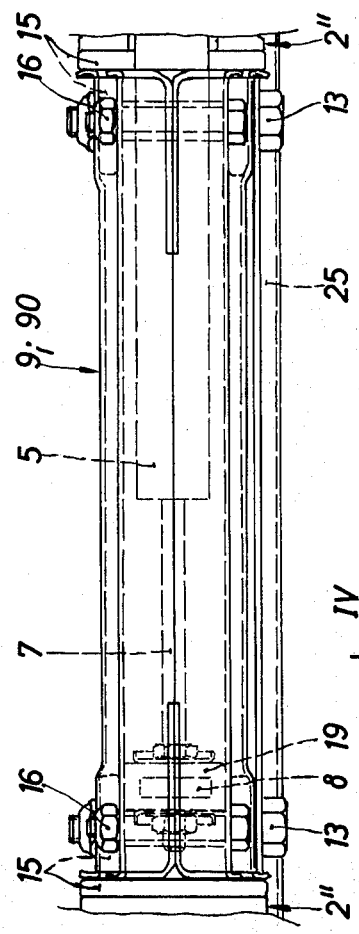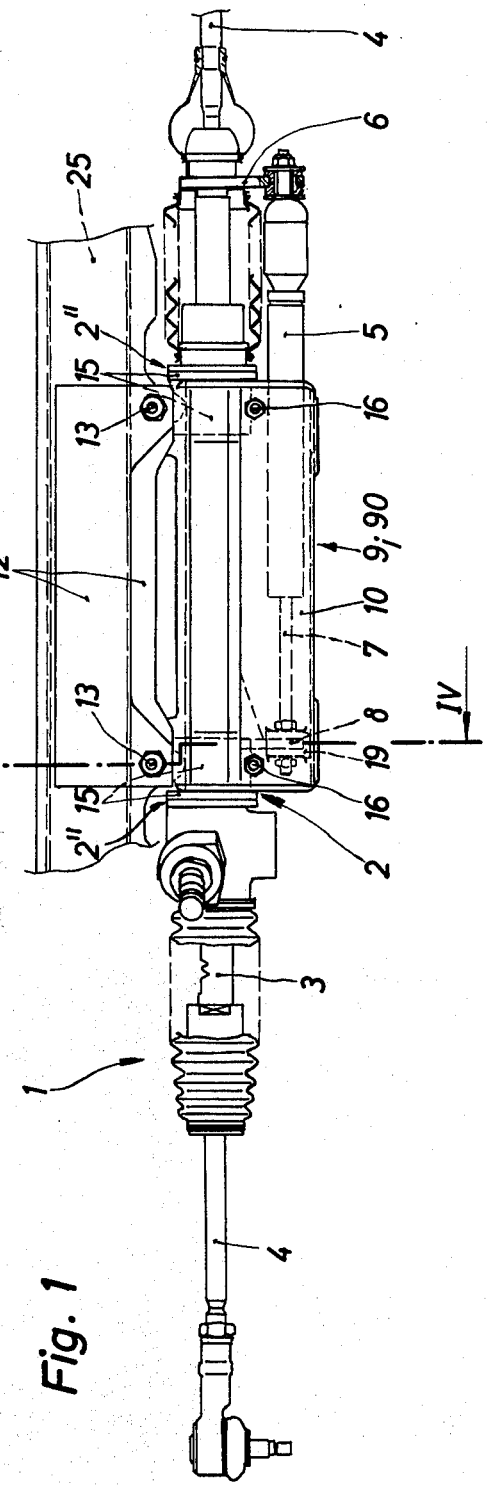
Fig. 2
Fig. 1

RACK AND PINION STEERING MECHANISM AND THE MOUNTING THEREOF AT AN AUTOMOTIVE VEHICLE

BACKGROUND AND SUMMARY OF THE INVENTION

This invention relates to a rack and pinion steering mechanism and the attachment thereof to an automotive vehicle, especially a passenger car, wherein the rack and pinion steering mechanism is elastically mounted to a part integral with the vehicle.

Rack and pinion steering mechanisms are known which are joined to a part fixedly attached to the vehicle by means of a direct threaded connection, as illustrated, for example, in DAS (German Published Application) 1,215,010. This rigid type of mounting has the result that the steering has a "jerky" effect, ensuing in an unharmonious, angular steering force characteristic.

In another, generally conventional type of mounting, the gearbox of the rack and pinion steering mechanism is surrounded clamplike by two brackets with the interposition of rubber strips, wherein the brackets are threaded together with the chassis. This rubber-elastic mounting of the gearbox extensively overcomes the disadvantages inherent in the aforementioned state of the art. However, the most important disadvantage of such rubber elastic mounting is that this type of mounting is not resistant to axially directed thrust forces whereby the gearbox of the rack and pinion steering can be shifted sideways in case of a thrust force effective in the axial direction, so that in certain cases the threaded connection is loosened.

It has also been proposed according to DOS (German Unexamined Laid-Open Application) 1,957,462 to elastically support the gearbox of the rack and pinion steering mechanism by means of two rubber rings inserted in the gearbox. This type of support, however, can disadvantageously absorb only axially directed thrust forces. Furthermore, this elastic bearing is very expensive from a constructional viewpoint. In the alternative type of arrangement of the reference in question, shown in FIG. 2, only an axially directed, elastic thrust absorption is possible, on the one hand, and furthermore, on the other hand, the bolt fixing the arrangement in place against axial shifting has the effect of a solid sound-conducting bridge.

This invention contemplates an arrangement which overcomes the problem of mounting the gearbox of a rack and pinion steering mechanism in a manner resistant to axial thrust on a part affixed to the vehicle (integral with the vehicle) by simple means, and thus to elastically absorb the forces effective on the gearbox in all directions.

To solve this problem, the invention contemplates providing a diagonally rigid holding means surrounding a gearbox of the rack and pinion steering mechanism in frictional engagement therewith by way of an elastic intermediate layer, wherein the holding means, in turn, is attached to a part integrally joined to the vehicle.

In a preferred embodiment of the invention, the provision is made to join the holding means on a broad base to the part integrally joined with the vehicle, by means of two screws wherein the elastic intermediate layer is arranged essentially in the zones near the end faces of the holding means.

A suitable preferred arrangement of the invention is distinguished in that the holding means for the gearbox consists of a carrier casing which is detachably connected with the front-axle support with its long side facing this support, wherein the shanks of the screws are disposed at a right angle to the longitudinal axis of the gearbox.

Further advantageous embodiments and features of the invention are characterized in the dependent claims.

Within the scope of the present invention, it is contemplated to provide that, in a rack and pinion steering mechanism according to the introduction which is equipped with a steering damper or shock absorber, the piston rod of this damper, joined to a holder — the latter being in turn attached to a part executing the steering motion — is to be protected against deleterious influences due to water and dirt. Furthermore, the steering damper is to be disposed so that a minimum bending moment is produced in its mounting elements.

In a preferred embodiment of the invention the steering damper is placed in close spatial relationship with the gearbox and the piston rod of the steering damper and the gear rack together are encompassed by a sealing bellows.

In a further development of this last-mentioned embodiment of the invention, the provision is made that the steering damper is arranged either in the immediate vicinity of the outer wall of the gearbox or it is combined with the gearbox into one unit.

The casing of this invention combines, with structurally simple means, an elastic support of the gearbox and the thrust-resistant mounting thereof at the front-axle support. By the encapsulation of the steering damper, optionally to be utilized, into the carrier casing, the damper is protected against deleterious entrance of water and dirt, as well as against mechanical damage. Furthermore, excessive stresses on the screws joining the carrier casing with the front-axle support are avoided. The advantage of certain preferred embodiments of the invention resides in that the rack and the piston rod are entirely surrounded by the sealing bellows providing complete tightness with regard to air and moisture.

These and other objects, features and advantages of the present invention will become more apparent from the following description when taken in connection with the accompanying drawings which show, for purposes of illustration only, several embodiments in accordance with the present invention.

BRIEF DESCRIPTION OF THE DRAWINGS

FIG. 1 is a top plan view which shows a rack and pinion steering mechanism with steering damper and a mounting arrangement for same according to a first preferred embodiment of the present invention;

FIG. 2 is a partial front view of a portion of FIG. 1 on an enlarged scale;

DETAILED DESCRIPTION OF THE DRAWINGS

Figure 3:
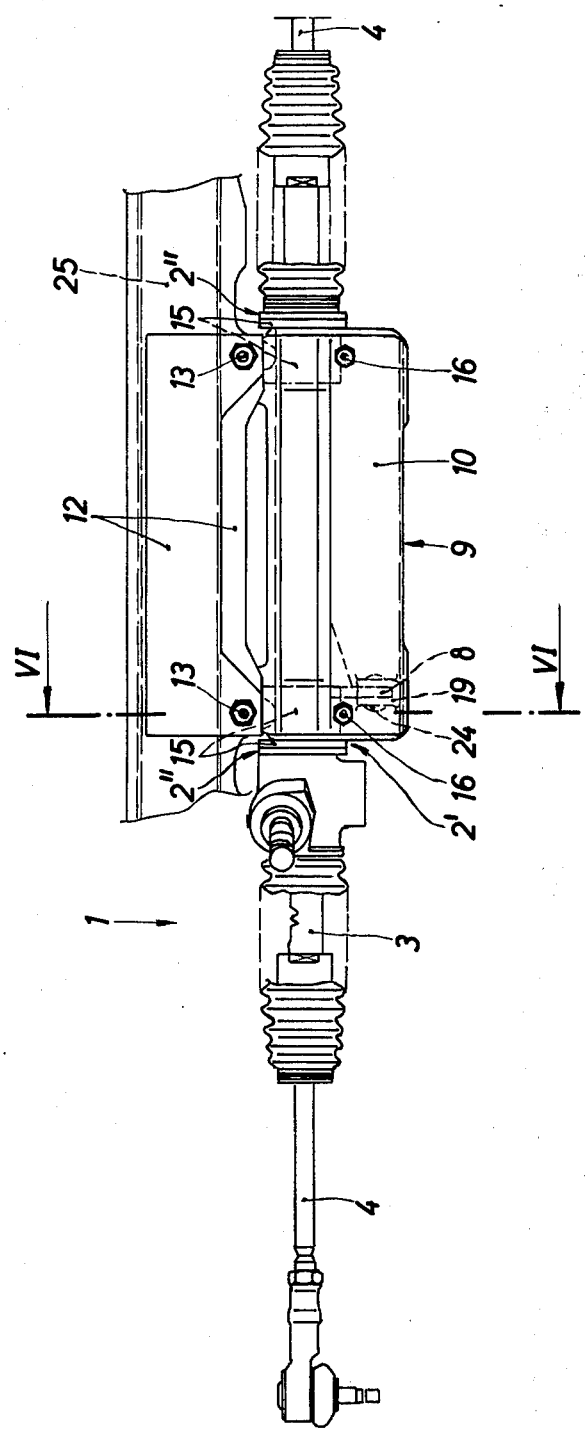
FIG. 3 is a top plan view similar to FIG. 1 which shows a rack and pinion steering mechanism without a steering damper and a mounting arrangement for same according to a further preferred embodiment of the present invention.

Throughout the various views, like reference numerals designate like structures.

The rack and pinion steering mechanisms schematically illustrated in FIGS. 1 and 3, denoted by reference numeral 1, each comprises essentially a gearbox 2, 2' with a rack 3, respectively one tie rod 4 being articulated to the rack at both of its ends. The rack and pinion steering mechanism 1 shown in FIG. 1 has a steering damper 5 arranged axially in parallel with the rack 3. This damper 5 is mounted to a holder 6 and its piston rod 7 cooperates with an arm 8 projecting from the gearbox 2. The gearboxes 2, 2' exhibit at each of their respective ends a collar 2 '' extending away from their outer periphery.

Figure 4:
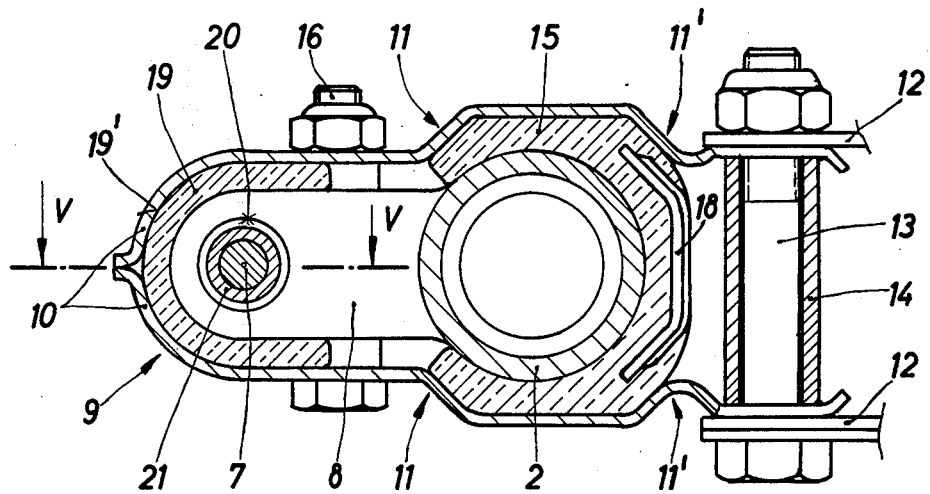
FIG. 4 shows a section, rotated by 90°, along line IV—IV of FIG. 1 on an enlarged scale.
Figure 6:
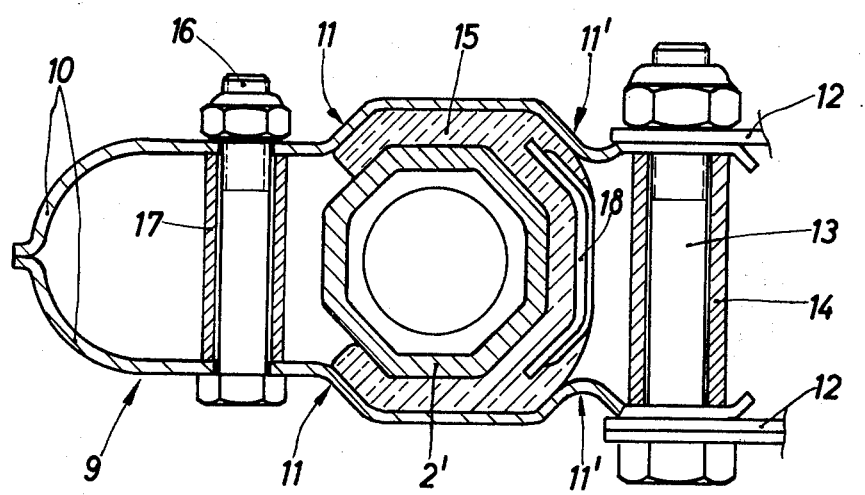
FIG. 6 shows a section, rotated by 90°, along line VI—VI of FIG. 3 on an enlarged scale.

As shown in FIGS. 4 and 6, the housings 2, 2' are largely surrounded along their outer periphery by an elastic intermediate layer 15. On the long side of the gearboxes 2, 2' facing the front axle support 25, an insert part 18 is embedded in this intermediate layer, the cross-sectional profile of this insert part 18 corresponding approximately to the outer configuration of the respective gearbox 2, 2'.

It can be seen from FIGS. 1-3 that the intermediate layer 15 contacts laterally each collar 2'' of the gearboxes 2, 2' and consists of two parts arranged near the respective two ends of the gearboxes 2, 2'. The intermediate layer 15 and thus the gearboxes 2, 2' are encompassed with a clamping action by a carrier casing 9 consisting of two housing parts 10. The housing parts 10 are connected with each other by means of two screws 16 with the interposition of respectively one spacer sleeve 17 (see FIGS. 1-4 and 6). The free ends of the housing parts 10 are attached to mounting tongues 12 projecting from a front-axle support 25 by means of two screws 13 inserted at a right angle to the longitudinal axis of the respective gearboxes 2,2' with the interposition of respectively one spacer sleeve 14.

The housing parts 10 have respectively one offset portion forming a shoulder 11, 11' in the zone encompassing the gearbox 2, 2', this shoulder extending toward the plane of symmetry of the gearbox. The shoulders 11, 11' effect advantageously a flush abutment of the elastic intermediate layer 15 in this region against the outer shell of the gearboxes, 2, 2' when the screws 13 and 16 are tightened. By the inclined legs of the insert part 18 disposed adjacent to the shoulder 11', the elastic intermediate layer 15 is, when the screws 13 are tightened, pressed by means of the insert part 18 against the outer shell of the gearbox 2, 2' also in the zone between the free ends of the housing parts 10.

The required elastic axial fixation of the gearboxes 2, 2' is accomplished, as shown especially in FIG. 2, by the feature that the two collars 2'' contact with pretensioning the axial end faces of the carrier casing 9, 90 by way of the elastic intermediate layer 15 present at this location. For this purpose, the housing parts 10 or 100, 101 are provided on their two outer ends advantageously with respectively one radially projecting flange.

Inasmuch as the gearboxes 2, 2' are embedded in this way in a compact manner and under a certain pretensioning, i.e. with elastic frictional engagement and without metallic contact, in the carrier casing 9, the shocks caused especially by an uneven roadway and introduced into the rack 3 are dampingly absorbed in all directions by the intermediate layer 15 within the scope of its elasticity. Besides, due to the elastic intermediate layer 15, a less direct response of the steering is obtained and a resultant harmonious steering power characteristic is thus achieved.

Figure 5:
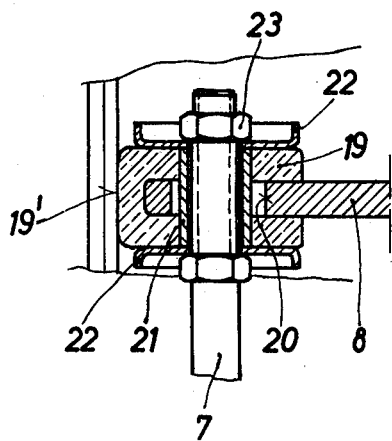
FIG. 5 shows a section along line V—V of FIG. 4.

The extension 8 (FIG. 1 and FIG. 4) projecting from the gearbox 2, 2' and optionally connected with the piston rod 7 is surrounded on its free end on all sides by an elastic cap 19 (FIG. 4 and FIG. 5). If the steering damper 5 is used, the extension 8 has a continuous bore 20 penetrated by the piston rod 7, the latter being provided with a spacer sleeve 21. In place of the piston rod 7, it is also contemplated to use for this purpose another mounting element attached to the steering damper 5. On the end faces of the spacer sleeve 21, respectively one thrust washer 22 is provided in contact therewith, this washer being in connection with the outside of the elastic cap 19. When the threaded nut 23 engaging at the end of the piston rod 7 is tightened, a clamping connection is established between the piston rod 7 and the extension 8. To prevent metallic contact between the spacer sleeve 21 and the extension 8, the continuous bore 20 has a radial play with respect to the spacer sleeve 21 (FIG. 5).

The carrier casing 9 encompasses the narrow-sided outer wall surface 19' of the elastic cap 19 under a certain pretensioning action, whereby the extension 8 and thus the gearbox 2 are held in the carrier casing 9 so that they are completely secured against rotation.

To maintain security against rotation, the gearbox 2' illustrated in FIG. 6 is provided with an outer configuration made up of planar surfaces, for example in the shape of an octagon and can be provided, if necessary, additionally with the extension 8 as shown in FIG. 3. In this connection — since the rack and pinion steering mechanism 1 shown herein does not include a steering damper — the elastic cap 19 is attached to the extension 8 by means of a connecting element 24 (FIG. 3).

Figure 7:
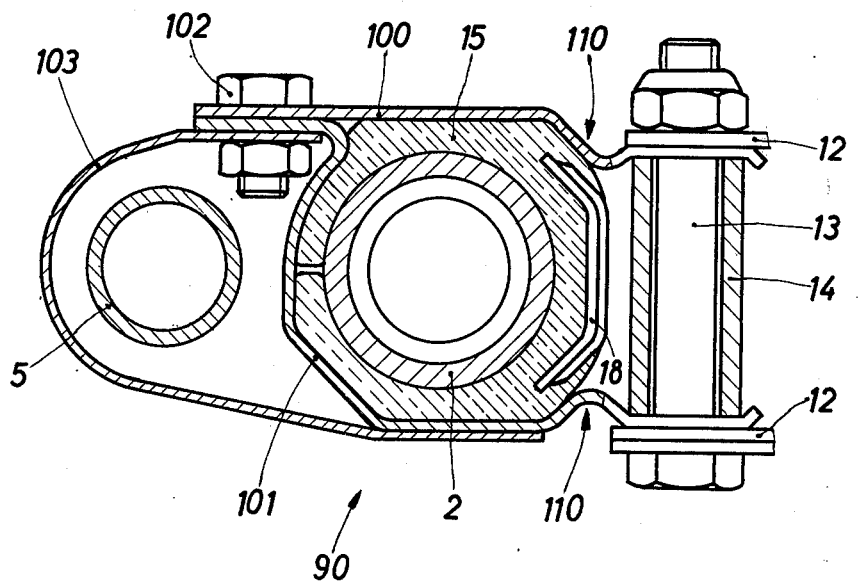
FIG. 7 is a sectional view similar to FIGS. 4 and 6 which shows another preferred embodiment of the invention, wherein the casing parts are of an asymmetrical configuration and include a cover surrounding the steering damper.

The rack and pinion mounting arrangement with carrier casing 90 shown in FIG. 7 is extensively similar to the mounting arrangement with carrier casing 9. Therefore, identical parts have in each case the same reference numerals. The carrier casing 90 consists of a first housing part 100 provided with a shoulder 110, contacting predominantly in a straight plane the outer periphery of the gearbox 2 with the elastic intermediate layer 15 associated therewith, whereas a second housing part 101, which is also provided with a shoulder 110, extends around a partial distance of the outer periphery of the gearbox 2 up to the first housing portion 100 and is joined to the latter; a screw connection 102 serving for establishing this connection. The elastic intermediate layer 15 is likewise (as described above for the other embodiments) arranged at the outer periphery of the gearbox 2, this intermediate layer consisting of two parts and being equipped with the insert part 18. If the rack and pinion steering mechanism 1 supported by the carrier casing 90 is provided with a steering damper 5, a cover 103 is mounted to the carrier casing 90 to shield this damper. The elastic clamping of the gearbox 2 in the carrier casing 90 and its mounting to the front-axle support 25 is effected in complete analogy to that of the carrier casing 9, so that no detailed remarks in this connection are required. The necessary security against rotation of the gearbox 2 held by the carrier casing 90 is likewise effected by the extension 8 projecting from the gearbox (not illustrated in FIG. 7), or by means of a noncircular outer configuration of the housing and, if necessary, additionally by the extension 8.

Due to the mounting of the carrier casing 9, 90 according to this invention to the front-axle support 25 by means of the screws 13 arranged at a right angle to the longitudinal axis of the gearbox 2, 2', these screws are subjected to a "double-shearj" stress, namely a stress effective at the upper and lower mounting straps 12, whereby advantageously the required screw strength can be dimensioned to be weaker than in the type of prior-art mounting mentioned in the foregoing.

Figure 9:
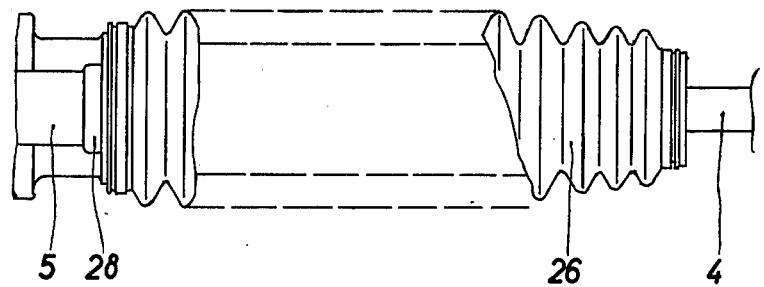
FIG. 9 is a front view of FIG. 8.
Figure 8:
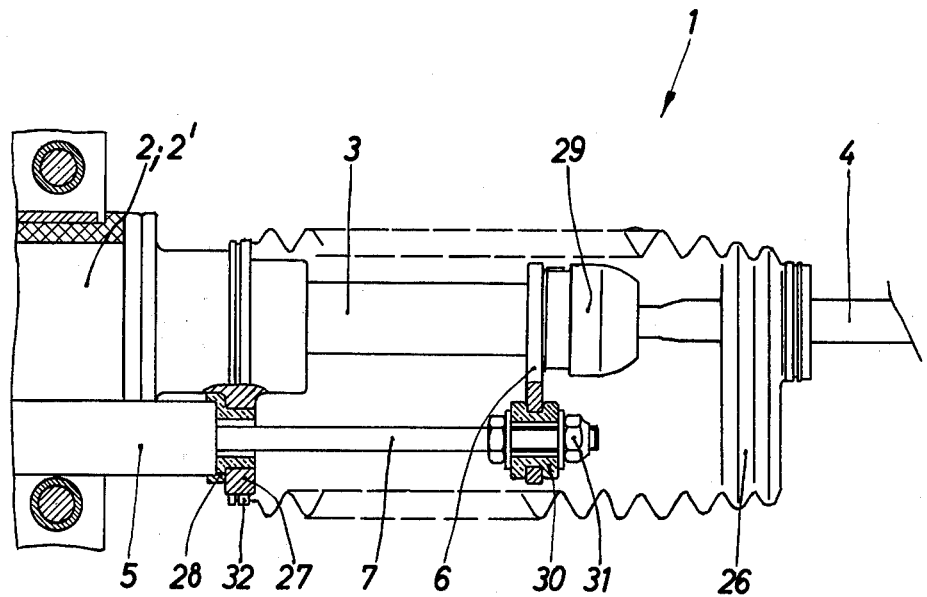
FIG. 8 is a partial sectional top plan view of a rack and pinion steering mechanism with a steering damper and mounting arrangement according to another preferred embodiment of the invention wherein the piston rod is connected to a holder joined to the rack.

In the rack and pinion steering mechanism 1 shown in portions in FIGS. 8 and 9, the steering damper 5 is inserted in a turned-around position as compared to the rack and pinion steeri;ng mechanism 1 illustrated in FIGS. 1–3. The holder 6 is preferably firmly joined to the rack 3; it would likewise be possible according to the invention to connect this holder with another part executing the steering motions, for example with a spherical joint 29. At its free end, the holder 6, which has a rectangular cross-sectional profile, is braced with the interposition of a rubber element 30 against the piston rod 7 of the steering damper 5 by means of a threaded nut 31 engaging the end of the piston rod 7.

In order to minimize the bending moment produced, when the steering damper 5 becomes effective, in its mounting elements, especially in the holder 6, and thus be able to make the mounting elements with minimum dimensions, the steering damper 5 is directly attached to the outer shell of the gearbox 2, 2', as shown in FIG. 8. Embodiments of the invention are also contemplated which combine the steering damper 5 with the gearbox 2, 2' into one structural unit (module), preferably by means of a single cast housing.

As illustrated in FIG. 8, a wall 27 extends radially away from one end of the gearbox 2, 2'; a bellows collar 26 is mounted to this wall, for example by means of a clamp strap 32, this bellows collar being attached on its other end to the tie rod 4. Thereby, the space within the bellows collar 26 — i.e. the piston rod 7 and the rack 3 — is advantageously sealed off entirely from air and moisture.

An elastic sealing ring 28 is inserted in the wall 27, this ring receiving the steering damper 5 and sealing same off from the outside, so that thus the space encompassed by the bellows collar 26 is also sealed off at this location.

Embodiments of the invention are also contemplated wherein the carrier casing is constructed of a single piece. The longitudinal division of this casing is provided according to the illustrated preferred embodiments for the reason that the manufacture thereof is made more advantageous from a technical viewpoint by this feature.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. Rack and pinion steering apparatus for a vehicle comprising:
    a rack and pinion steering mechanism having a gearbox,
    and mounting means for elastically mounting said steering mechanism to a fixed vehicle part,
    said mounting means including a diagonally rigid holding means encompassing said gearbox in frictional engagement therewith by way of an elastic intermediate layer, said holding means being directly attachable to said fixed vehicle part.

2. Apparatus according to claim 1, wherein said gearbox extends transversely of said vehicle and surrounds a movable member of said steering mechanism, and wherein said fixed vehicle part is a front-axle support.

3. Apparatus according to claim 2, wherein the holding means is connected along a wide base to the front-axle support by means of two screws and wherein the elastic intermediate layer is provided essentially in the zone of the end faces of the holding means.

4. Apparatus according to claim 3, wherein the holding means includes a carrier casing which is detachably mounted to the front-axle support with its long side facing the front-axle support, and wherein shanks of the screws are oriented at a right angle to the longitudinal axis of the gearbox.

5. Apparatus according to claim 4, wherein the carrier casing consists of two substantially symmetrical housing parts which are connected via interposed spacer sleeves by means of a clamping connection.

6. Apparatus according to claim 5, wherein each housing part has shoulders extending toward a central plane of the gearbox, these shoulders being located in the zone in which the casing encompasses the gearbox.

7. Apparatus according to claim 2, characterized in that the gearbox has a noncircular, for example octagonal outer configuration.

8. Apparatus according to claim 6, characterized in that the gearbox has a noncircular, for example octagonal outer configuration.

9. Apparatus according to claim 2, wherein the elastic intermediate layer encompasses the outer periphery of the gearbox at least on two mutually facing outer wall surfaces and consists of two separate elastic intermediate layer parts located on the two ends of the gearbox.

10. Apparatus according to claim 4, wherein the elastic intermediate layer encompasses the outer periphery of the gearbox at least on two mutually facing outer wall surfaces and consists of two separate elastic intermediate layer parts located on the two ends of the gearbox.

11. Apparatus according to claim 8, wherein the elastic intermediate layer encompasses the outer periphery of the gearbox at least on two mutually facing outer wall surfaces and consists of two separate elastic intermediate layer parts located on the two ends of the gearbox.

12. Apparatus according to claim 4, wherein an insert part is embedded in the elastic intermediate layer in the zone of at least one of the long sides of the gearbox not encompassed by the carrier casing, especially on the side facing the front-axle support, the cross-sectional profile of this insert part corresponding approximately to the outer configuration of the gearbox.

13. Apparatus according to claim 6, wherein an insert part is embedded in the elastic intermediate layer in the zone of at least one of the long sides of the gearbox not encompassed by the carrier casing, especially on the side facing the front-axle support, the cross-sectional profile of this insert part corresponding approximately to the outer configuration of the gearbox.

14. Apparatus according to claim 11, wherein an insert part is embedded in the elastic intermediate layer in the zone of at least one of the long sides of the gearbox not encompassed by the carrier casing, especially on the side facing the front-axle support, the cross-sectional profile of this insert part corresponding approximately to the outer configuration of the gearbox.

15. Apparatus according to claim 4, wherein the gearbox includes two collars and is housed via its two collars under pretensioning in planar sides of the carrier casing with a bilateral association of the elastic intermediate layer and wherein the carrier casing has housing parts each having a radially projecting extension on their outer ends.

16. Apparatus according to claim 8, wherein the gearbox includes two collars and is housed via its two collars under pretensioning in planar sides of the carrier casing with a bilateral association of the elastic intermediate layer and wherein the carrier casing has housing parts each having a radially projecting extension on their outer ends.

17. Apparatus according to claim 4, wherein said steering mechanism includes a steering damper having a piston rod extending adjacent said gear box, and wherein steering damper and its piston rod are disposed within the carrier casing.

18. Apparatus according to claim 6, wherein said steering mechanism includes a steering damper having a piston rod extending adjacent said gear box, and wherein steering damper and its piston rod are disposed within the carrier casing.

19. Apparatus according to claim 15, wherein said steering mechanism includes a steering damper having a piston rod extending adjacent said gear box, and wherein steering damper and its piston rod are disposed within the carrier casing.

20. Apparatus according to claim 2, wherein said steering mechanism includes a steering damper having a piston rod, an extension projecting from the gearbox is equipped on its free end with an elastic cap, wherein the extension has a continuous bore penetrating a mounting element of the steering damper predominantly the piston rod thereof, the latter being provided with a spacer sleeve, respectively one thrust washer being in contact with the planar sides of this sleeve and also being connected with the outside of the cap so that the walls of the cap contacting the broad sides of the extension are braced, with the interposition of the extension, by means of a threaded nut engaging at the end of the piston rod.

21. Apparatus according to claim 4, wherein said steering mechanism includes a steering damper having a piston rod, an extension projecting from the gearbox is equipped on its free end with an elastic cap, wherein the extension has a continuous bore penetrating a mounting element of the steering damper predominantly the piston rod thereof, the latter being provided with a spacer sleeve, respectively one thrust washer being in contact with the planar sides of this sleeve and also being connected with the outside of the cap so that the walls of the cap contacting the broad sides of the extension are braced, with the interposition of the extension, by means of a threaded nut engaging at the end of the piston rod.

22. Apparatus according to claim 14, wherein said steering mechanism includes a steering damper having a piston rod, an extension projecting from the gearbox is equipped on its free end with an elastic cap, wherein the extension has a continuous bore penetrating a mounting element of the steering damper predominantly the piston rod thereof, the latter being provided with a spacer sleeve, respectively one thrust washer being in contact with the planar sides of this sleeve and also being connected with the outside of the cap so that the walls of the cap contacting the broad sides of the extension are braced, with the interposition of the extension, by means of a threaded nut engaging at the end of the piston rod.

23. Apparatus according to claim 20, wherein a radial play exists between the outer diameter of the spacer sleeve and the continuous bore of the extension.

24. Apparatus according to claim 22, wherein a radial play exists between the outer diameter of the spacer sleeve and the continuous bore of the extension.

25. Apparatus according to claim 21, characterized in that the extension projects from the gearbox and carries on its free end the elastic cap which extends all the way around this extension, this cap being surrounded under pretensioning along its narrow-sided outer wall surface by the carrier casing.

26. Apparatus according to claim 4, wherein the carrier casing is constructed of a plurality of housing parts, forming the carrier casing are fashioned so that a first housing part projects away in a particularly straight plane tangent on the outer periphery of the gearbox from the mounting point at the front-axle support, while a second housing part extends around part of the outer periphery of the gearbox and is joined with the first housing part by a screw connection and wherein the gearbox is embedded in the thus-formed carrier casing by way of the intermediate layer.

27. Apparatus according to claim 26, wherein said steering mechanism includes a steering damper having a piston rod, and wherein the carrier casing is provided with a cover.

28. Apparatus according to claim 27, wherein said cover covers a potion of said steering damper.

29. Rack and pinion apparatus for a vehicle comprising:
 a rack and pinion steering mechanism having a rack and gearbox,
 and mounting means for elastically mounting said steering mechanism to a fixed vehicle part,
 said steering mechanism including a steering damper having a piston rod,
 wherein said steering damper is in close spatial relationship with the gearbox, and wherein the piston rod and the rack are both surrounded by a bellows collar.

30. Apparatus according to claim 29, wherein the steering damper is disposed in the immediate vicinity of the outer wall of the gearbox.

31. Apparatus according to claim 29, wherein the steering damper is combined with the gearbox into one structural unit.

32. Apparatus accordng to claim 29, wherein a wall projects radially away from the outer periphery of the gearbox to which wall the bellows collar is attached, which latter is, in turn, connected with a tie rod for executing the steering motions.

33. Apparatus according to claim 30, wherein a wall projects radially away from the outer periphery of the gearbox to which wall the bellows collar is attached, which latter is, in turn, connected with a tie rod for executing the steering motions.

34. Apparatus according to claim 32, wherein an elastic sealing ring is inserted in the wall, this ring sealingly receiving the steering damper.

35. Apparatus according to claim 29, wherein a free end of a holder projecting from a part executing the steering motions has a rectangular cross-sectional profile and is braced by means of the piston rod with the interposition of a rubber element by means of a threaded nut engaging the end of the piston rod.

36. Apparatus according to claim 35, wherein said part executing the steering motion is one of a rack extending out of the gearbox and a spherical joints.

* * * * *